US006543908B1

(12) United States Patent
Chenet et al.

(10) Patent No.: US 6,543,908 B1
(45) Date of Patent: Apr. 8, 2003

(54) SUBMERSIBLE LIGHT GENERATOR FOR GLASS OR PLASTIC OPTICAL FIBRES

(75) Inventors: Pierre Chenet, Antony (FR); Jean-Michel Gerbeaux, Forges-les-Bains (FR)

(73) Assignee: Optectron Industries, Les Ulis (FR)

( * ) Notice: Subject to any disclaimer, the term of this patent is extended or adjusted under 35 U.S.C. 154(b) by 0 days.

(21) Appl. No.: 09/856,475

(22) PCT Filed: Dec. 8, 1999

(86) PCT No.: PCT/FR99/03056
§ 371 (c)(1),
(2), (4) Date: Jun. 8, 2001

(87) PCT Pub. No.: WO00/34711
PCT Pub. Date: Jun. 15, 2000

(30) Foreign Application Priority Data

Dec. 8, 1998 (FR) .......................................... 98 15635

(51) Int. Cl.[7] .............................................. F21V 31/00
(52) U.S. Cl. ...................................... 362/267; 362/580
(58) Field of Search ................................ 362/267, 198, 362/562, 580, 581; 405/186

(56) References Cited

U.S. PATENT DOCUMENTS

| 4,922,385 A | * | 5/1990 | Awai ........................... 362/294 |
| 5,099,399 A | * | 3/1992 | Miller et al. ................. 362/294 |
| 5,278,596 A | | 1/1994 | Machtig |
| 5,295,052 A | | 3/1994 | Chin et al. |
| 6,302,571 B1 | * | 10/2001 | Davenport et al. ......... 362/267 |

FOREIGN PATENT DOCUMENTS

| FR | 2 730 038 | 8/1996 |
| FR | 2 757 929 | 7/1998 |

* cited by examiner

Primary Examiner—Sandra O'Shea
Assistant Examiner—Hargobind S. Sawhney
(74) Attorney, Agent, or Firm—Oblon, Spivak, McClelland, Maier & Neustadt, P.C.

(57) ABSTRACT

The invention concerns a submersible light generator with an impermeability protection index (IP) of 68 for glass or plastic optic fibers, including a plurality of impervious modules, wherein at least one lamp module and at least one transfer module of the light beam are provided, these modules being thermally separated and insulated from each other, but connected to each other in an impervious manner. Moreover, the generator sheath has the ability to capture and transfer of heat towards the exterior within each module.

15 Claims, 5 Drawing Sheets

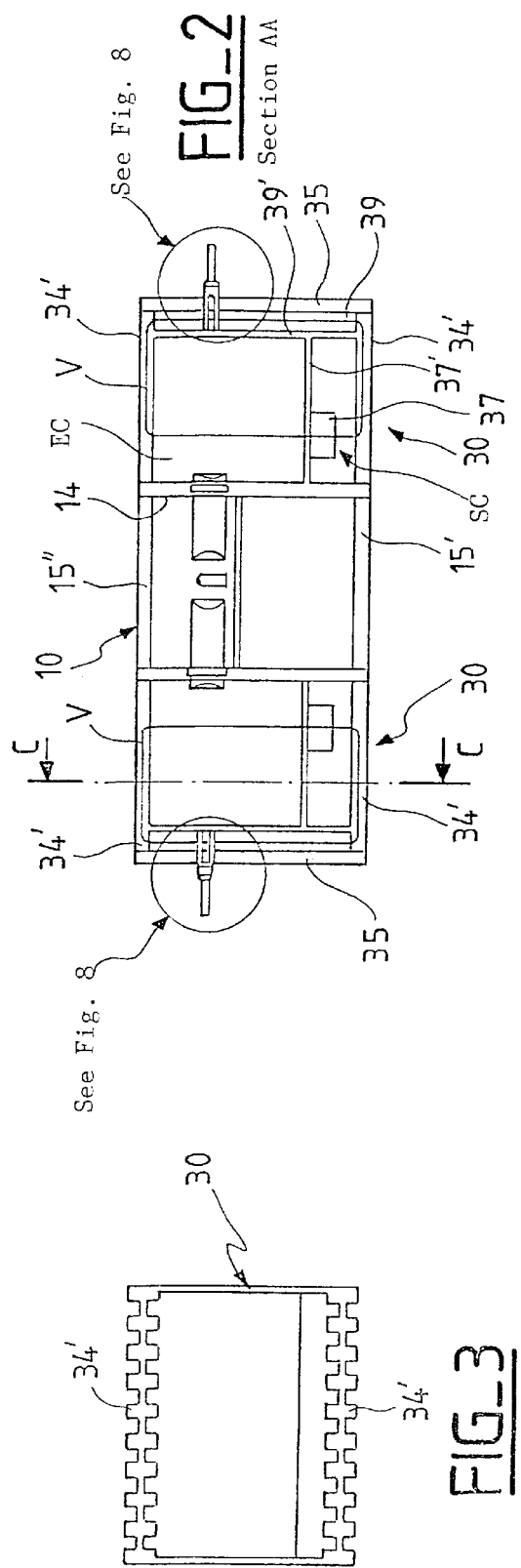
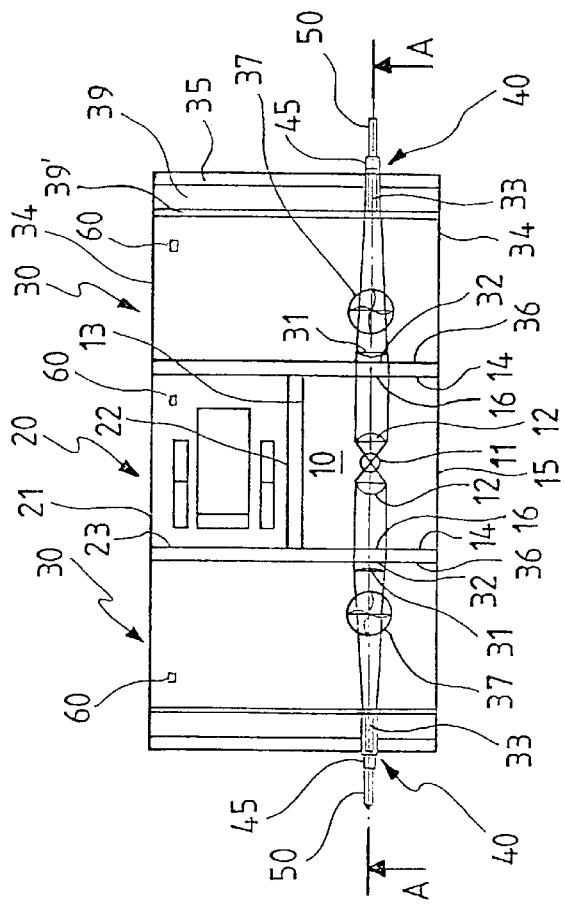

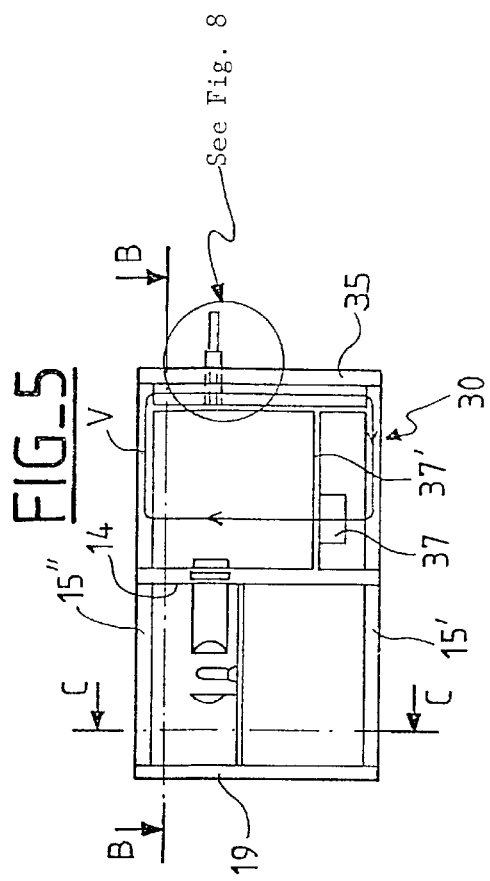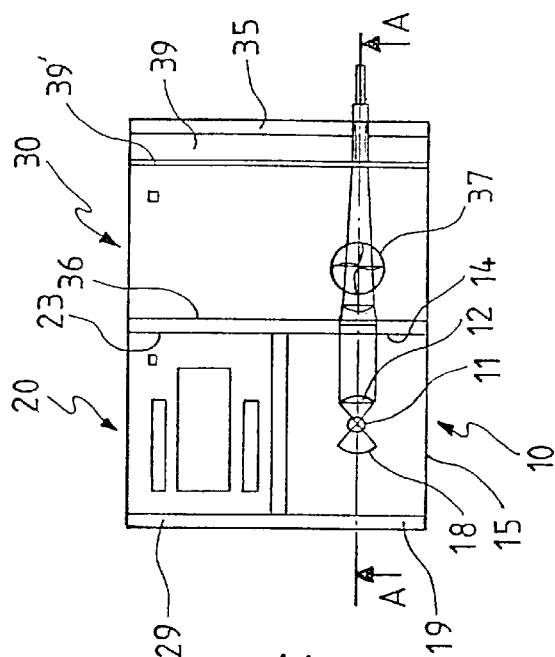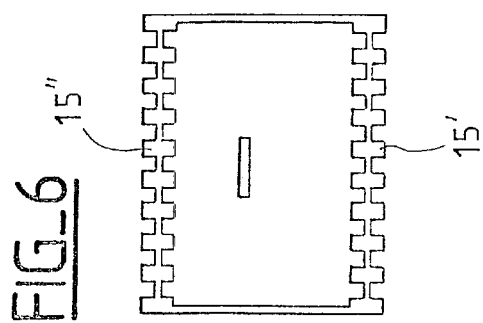

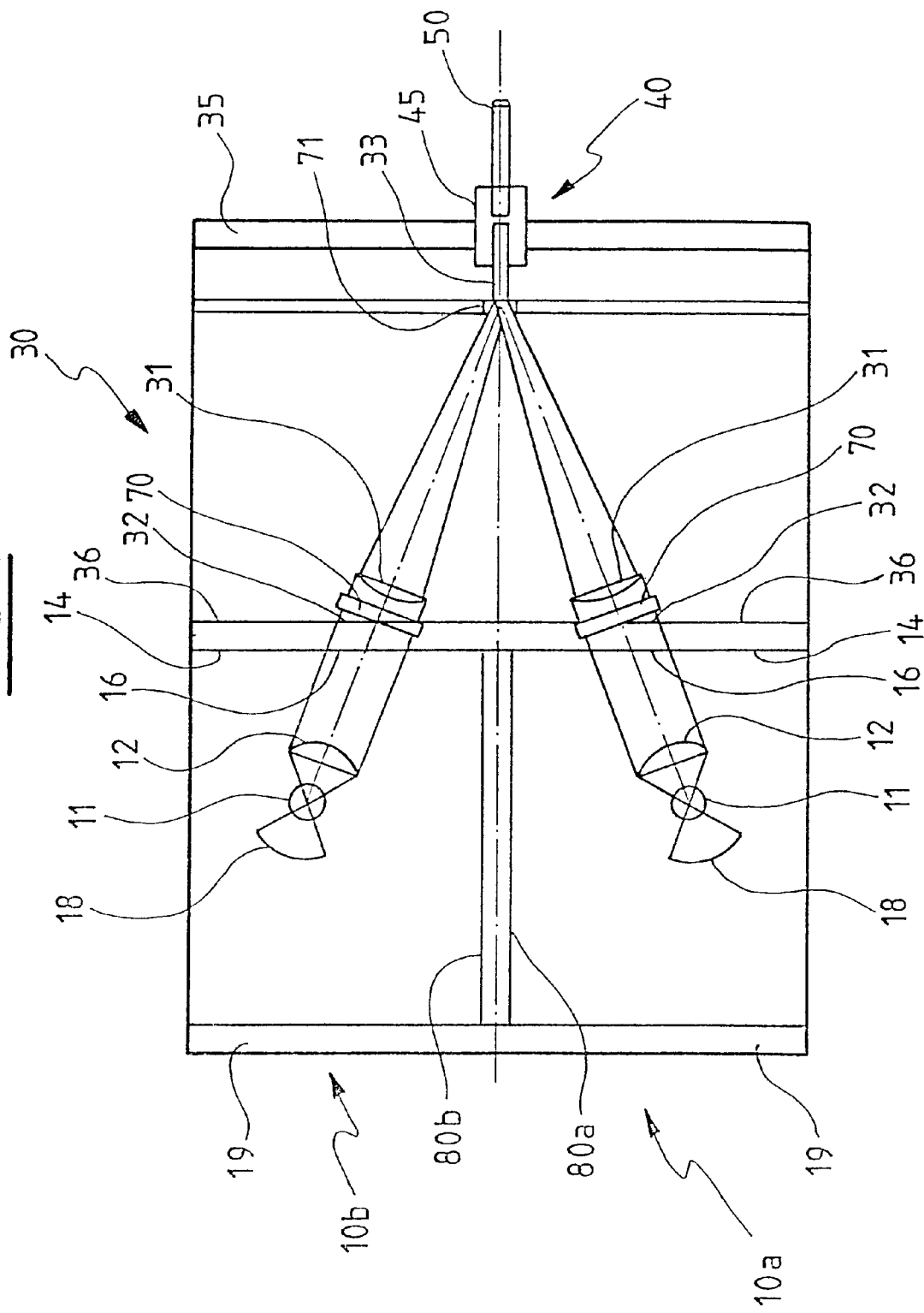

FIG_8a
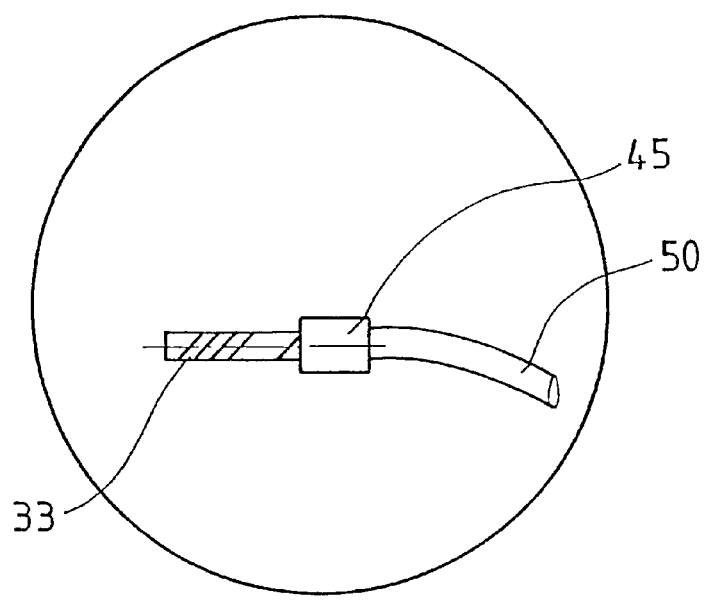
FIG_8b
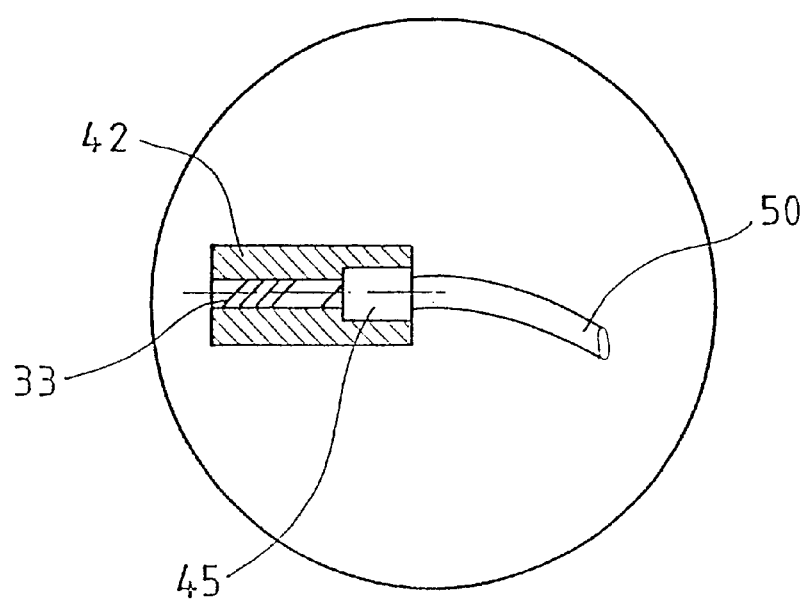

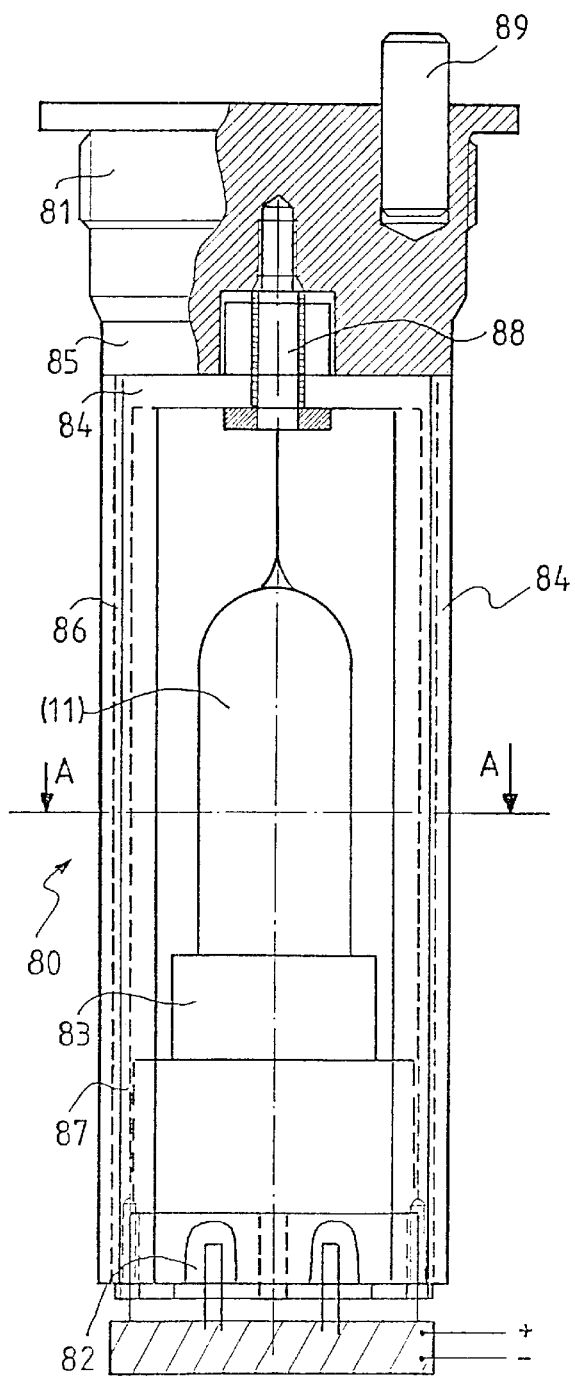
FIG_9a
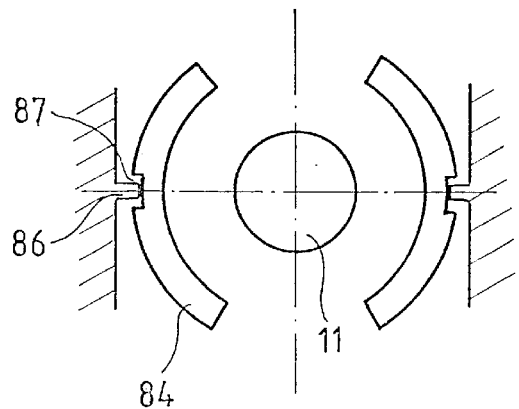
FIG_9b

SUBMERSIBLE LIGHT GENERATOR FOR GLASS OR PLASTIC OPTICAL FIBRES

TECHNICAL FIELD

The invention concerns a submersible light generator with an impermeability protection index (IP) of 68 for glass or plastic optic fibers.

BACKGROUND ART

Impermeability with a protection index of 68 is defined in norm EN 60 598 1. In brief, the term submersible light generator with an impermeability protection index of 68 refers to the fact that the light generator can be submerged and function properly at a water depth of 20 meters, possibly at even deeper depths in some cases. An impermeability protection index (IP) of 68 means that it is impossible for dust and fluid to penetrate the apparatus or parts of the apparatus having such an impermeability performance.

Lighting by means of glass or plastic optic fibers, usually using plastic optic fibers, such as methyl polymethacrylate, is becoming more and more common.

In the most important applications, such as in the fields of signaling, beaconing of ways, rails and car parks, industrial and road lighting, security and building lights, researches are currently made to improve light generators for optic fibers with the aim of achieving the following results:
- the possibility of placing light generators in areas susceptible to flooding or under water;
- the use of light generators with high internal thermal dissipation allowing the temperature to be reduced at the inlet of optic fiber cables or beams. Indeed, plastic optic fibers, generally made of methyl polymethacrylate, cannot withstand sustained high temperatures in excess of 80° C.;
- development of light generators whose noise level, mainly because of the ventilation systems, is reduced to the maximum.

Light generators for use in optic fiber lighting systems are now commercially available but none of them has, in the present state of the art, all the properties listed above, especially impermeability defined by a protection index of 68 under a water depth of 20 meters.

Currently available generators generally consist of a metallic iodide or xenon halogen lamp, combined with a reflector which reflects light after it has passed through an appropriate focusing optic system in the direction of the beam or cable of optic fibers in charge of transmitting light in one or several points to the desired location. One of the major disadvantages of these generators is that it is difficult to obtain the best compromise between the intensity of light transmitted by the cable and the increase in temperature at the cable inlet. This can lead to the deterioration of plastic optic fibers due to temperatures they could be exposed to, which can exceed 80° C. This is why these generators have to be fitted with heat filters which, in addition to infrared radiation, absorb a significant part of visible light.

To avoid the risk of aging of plastic fibers, a W (ultraviolet) filter is sometimes necessary.

One or more ventilators are also needed to evacuate heat generated inside such generators. These ventilators give rise to a number of problems. Firstly, they are a source of unwanted noise, particularly inconvenient in some applications, because of the openings and air vents provided on some sides of said generators. Secondly, these generators cannot be used in very humid environments where there is waterstreaming or flooding. Furthermore, these openings and vents often allow some of the light fog emitted by the lamp to pass through, thus creating an undesirable light fog.

DISCLOSURE OF THE INVENTION

The present invention concerns a light generator for plastic or glass optic fibers which can function equally well in air and underwater, and which can be submerged to a depth of 20 meters, possibly more in some cases.

This invention also covers a light generator for plastic or glass optic fibers which makes it possible to have a temperature at the inlet of optic fiber cables or beams which is low enough to prevent degradation by fusion of the optic fibers, especially when these are made of plastic.

The invention also concerns a submersible light generator with an impermeability protection index of 68, for glass or plastic optic fibers, wherein:
a) the generator comprises several impervious modules, these modules being thermally separated and insulated from each other, but connected to each other in an impervious manner,
b) the basic modules of a light generator are:
  - at least one impervious module, the lamp, comprising at least one lamp sending at least one light beam over at least one focusing optic system, the lamp module being connected in an impervious manner to an electric energy source,
  - at least one impervious module, the transfer module, which receives the light beam leaving the lamp module, where one of the lateral sides of the transfer module is close to one of the lateral sides of the lamp module, the passage of the light beam taking place across two sealed windows made of an optically transparent material, positioned opposite each other respectively in said lateral sides of the lamp and transfer modules, the transfer module having on another side thereof a connector for a set of optic fibers conducting light generated by the generator, in the form of a beam of optic fibers or an optic cable;
c) between the lateral sides of the lamp and transfer modules facing each other, outside the zone provided for the passage of the light beam which is delimited by the two sealed windows, means are provided to ensure the impermeability IP 68 of the lamp and transfer modules with the external environment, which take into account the thermal expansion and the thermal shrinkage of materials, and means to thermally insulate these modules from each other.

To this end, a first seal, a thermal insulator and a second seal, which fulfil the above-described functions, are included, preferably successively;
d) the other sides of the lamp and transfer modules are made of a good heat conductor material and, when these sides constitute part of the external sheath of the light generator, these sides are configured to have the largest thermal exchange external surface in contact with the external environment and an internal surface in contact with the internal atmosphere of the modules allowing optimum heat transfer towards the outer surface.

Within the scope of this invention, the term "impervious" will be used to define elements having an impermeability protection index IP of 68.

Preferably, the impervious and thermally insulating separation provided between the lamp and transfer modules, which comprises an impervious and optically transparent passage of the light beam, is comprised of:

a plate made of a porous, mineral or organic material whose porosity has been blocked by soaking in a glue under vacuum, for example epoxy resin-based glues such as those sold under the brand name Araldite.

The thickness of the plate varies and depends on the thermal conductivity coefficient of the porous material. Plate thickness is advantageously equal to at least 5 mm and varies preferably between 5 mm and 20 mm.

Good results have been obtained with a plate made of a composite material sold under the brand name PAMITH-ERM:

which consists of sheets of mica with a high granulometry, soaked in a silicone resin with high thermal properties: thermal conductivity according to norm DIN 52612 equal to $2.10^{-3}$ Watt/cm.° K., average coefficient of lineic thermal expansion according to norm USM 77110 equal to $9.10^{-6°}$ K.$^{-1}$, good fire resistance, MOFO classification according to norm NF 16.101, which porosity has been blocked with the aid of an epoxy resin having a thermal stability greater than 200° C. in accordance with norm ISO 75.

and two seals provided on either side of the plate and which are compressed against the plate in the course of assembly and mechanical clamping of the lamp and transfer modules to each other.

Each seal can be either flat or ring shaped. Advantageously, each seal is silicon-based because of silicon's good resistance to humidity, to high temperatures and to chemical agents, and because of its elasticity and antirot nature.

To allow the passage of the light beam, as well as the passage of the assembly means and electrical connections of the generator modules, the seals, when they are flat, include openings whose dimensions correspond, on the one hand, to that of the optically transparent sealed windows and, on the other hand, to that of the impervious connecting areas for the assembly means and electrical connections.

According to one feature of the invention, since the sides of the transfer and lamp modules do not face each other, these are made of a material which is a good heat conductor, preferably aluminum or an appropriate non ferrous alloy.

Furthermore, the sides of the lamp and transfer modules which make up part of the external sheath of the light generator are configured such that their external surface in contact with the external environment and the internal surface in contact with the internal atmosphere of the modules are as large as possible in order to dissipate the heat produced by the functioning light generator. Thus, the cooling of the modules constituting the generator, especially the lamp module, is dramatically improved when the sides composing the external sheath of the light generator consist of blades forming a thermal exchange radiator. In order to encourage heat capture and evacuation, it is preferable to increase the external and internal surfaces of the modules where thermal exchanges take place by increasing the number of blades and/or by increasing the width of blades and/or the shape of blades. The external surface areas are preferably larger than the internal surfaces areas.

According to one embodiment of the invention, the transfer module can include a ventilator and/or a Peltier effect thermal exchange device.

Advantageously, the ventilator is placed in the passage of the light beam crossing the transfer module. The ventilator encourages air circulation within the transfer module, in a chicane circuit, around the internal surface of the blades.

A Peltier-effect thermal exchange device can be used instead of, or in combination with, the ventilator. The general principle for this device is the opposite of the one of a heat pump since this device is placed between a cold source outside the light generator and a hot point inside the transfer module.

The passage of the Peltier-effect thermal exchange device, through the transfer module, takes place through a seal which can reach a IP sealing of 68.

According to a second embodiment of the invention, the electrical energy source for the lamp can be integrated or not into the light generator. In the case where an impervious source module of IP 68 is integrated into the light generator, and therefore positioned close to the other generator modules, some means to limit the thermal exchanges between this source module and other modules are provided.

In the case where the source module is not integrated into the light generator, an impervious electrical connection must be provided between the source module and the generator.

When the module, called a source module, is integrated into the light generator according to the invention, it can be in a separate module placed close to the lamp module but without contact with the latter. Moreover, the source module can be positioned close to the transfer module.

Advantageously, the two sides of the lamp and source module facing each other are made of a material with good heat conductor properties, preferably the same material as that used to make the external sides of the light generator.

As a result, a free space is left between the two adjacent sides of the lamp and source modules. This free space is advantageously contacted with the exterior to allow evacuation of some of the heat generated in the two modules. A cold fluid (water or air) from the external environment can then circulate between these two modules.

Heat evacuation is thus improved thanks to the arrangement, in two separate levels, of the lamp and source modules.

With this arrangement, the source module is not overheated by the air emitted from the lamp module and, conversely, air circulating along the length of the source module does not add overheating along the axis of the light beam.

According to other advantageous features of the invention, the light generator according to the invention can include:

a light color-change device integrated into the light generator, advantageously placed in the transfer module(s).

Such a device essentially comprises an electric motor which rotates a transparent disc, incorporating a graphic design or a color, the disc being placed in the passage of the light beam, the speed of rotation of this disc being controlled by a computer program.

at least one heat filter placed in the direction of light beam flux to filter infrared and ultraviolet radiation at specific wavelengths. The use of such a filter is generally necessary when optic fibers are made of plastic.

Advantageously, one of the transparent and sealed windows, which allows the light beam to pass between the lamp module and the transfer module, consists of a heat filter.

an optic mixer-bar made of an optically transparent material.

BRIEF DESCRIPTION OF THE DRAWINGS

Two specific embodiments of the invention will now be described in more detail. This will clarify the fundamental features and advantages of the invention. These two embodiments are given purely for the purpose of illustration and are in no way limiting.

Their description is illustrated in the appended drawings in which:

FIG. 1 is a diagrammatic horizontal cross-section view of a light generator comprising two outlets for impervious optic fiber beams or impervious optic cables;

FIG. 2 is a cross-section view along axis A—A described in FIG. 1;

FIG. 3 is a cross-section view along axis C—C described in FIG. 2;

FIG. 4 is a diagrammatic horizontal cross-section view of a light generator comprising a single outlet to connect to the impervious optic fiber beam or impervious optic cable;

FIG. 5 is a cross-section view along axis A—A described in FIG. 4;

FIG. 6 is a cross-section view along axis C—C described in FIG. 5;

FIG. 7 is a diagrammatic horizontal cross-section partial view of a light generator comprising two separate lamp modules and a single outlet to connect to the impervious optic fiber beam or impervious optic cable;

FIGS. 8a and 8b are diagrammatic representations of one mode of connection of the optic fiber beam or cable to a generator according to the invention;

FIGS. 9a and 9b are diagrammatic representations of the removable device in which the lamp is fixed.

BEST MODE FOR CARRYING OUT THE INVENTION

FIG. 1 is a diagrammatic horizontal cross-section view of a light generator with dual-outlet for impervious beams of optic fibers or impervious optic cables. Such a generator is covered by claim 13.

This light generator comprises four impervious modules which are separated and thermally insulated from each other and connected to each other in an impervious manner. These four modules are:

a lamp module (10), an electrical energy source module (20), placed close to the lamp module (10) but without direct contact with the lamp module (10), two transfer modules (30) arranged on either side of the lamp module (10) and source module (20).

The lamp module (10) includes a lamp (11) without a reflector. For example, it can be a 20 to 300 W lamp such as a metallic iodide lamp or a halogen lamp or even a xenon lamp.

According to one embodiment represented in FIG. 1, the lamp (11) is without a reflector. It can therefore send two light beams by means of focusing optic systems (12, 31), through the sealed windows (16, 32) made of an optically transparent material and, if necessary, mixer-bars (33) made of an optically transparent material, towards two outlets (40) of the light generator which face each other, are symmetrical and located along the same axis. Light emitted by the lamp is thus transmitted in an almost monodirectional manner in two opposite directions. The focusing optic systems (12, 31) allow part of the light emitted in two opposite directions to be concentrated, each focused light beam being sent to an outlet (40) to an impervious connector (45) of the optic fiber beam (50) or optic cable (50), by means of a mixer-bar (33) made of an optically transparent material. In the case of a light generator without reflector lamp, the presence of mixer-bars is not absolutely necessary. However, in the case of a light generator with a reflector lamp (see description of FIGS. 4, 5 and 6 below), where the reflector is parabolic or elliptical, it is advisable to envisage using a mixer-bar to capture the light beam at the outlet of the transfer module, ahead of the impervious connection for the set of optic fibers.

The mixer-bar, which is generally made of an almost optically pure glass, leads to optimal focusing of the light beam without thermal problems, the mixture with modulation of light radiation, in order to make light emission more coherent, prevents scintillation and flickering phenomena and allows the focusing inside the bar.

The mixer-bar also plays the role of an optic index adapter.

The absence of a reflector associated with the lamp is advantageous in the case of lamps where the reflector is a separated element of the lamp, such as metallic iodide lamps. Indeed, with such lamps, it is necessary to choose the reflector sizes and its position in the light generator as a function of the type of lamp used. Because of this, the reflector efficiency is often very poor.

For example, by combining a reflector with a General Electric lamp of the type MBI 150/T/40 and using good adjustment conditions of the lamp-reflector couple, the intensity of the light flux emitted by the lamp alone is only increased by about 20%.

The lamp module (10) which includes a lamp (11) and a focusing system (12) is delimited by a casing comprised of:

a side (13) facing the source module (20), two sides (14) each facing one of the two transfer modules (30), three sides (15, 15' and 15") in contact with the external environment and which constitute parts of the visible external sides of the light generator.

In accordance with the invention, the side (13) is made of a good heat conductor and impervious material, preferably in aluminum.

Similarly, sides (15, 15' and 15") are made of a good heat conductor and impervious material, preferably aluminum. Moreover, sides (15, 15' and 15") are configured such that their external surfaces in contact with the external environment and the internal surfaces in contact with the internal atmosphere of the module are as large as possible, the external surface areas being larger than the internal surfaces areas.

Advantageously, the external and internal surfaces of the sides (15, 15' and 15") consist of blades forming a thermal exchange radiator, sufficient in number and size to allow evacuation of the heat produced by the lamp.

The transfer (30) and lamp (10) modules are separated by a plate made of a porous mineral material which porosity has been blocked by vacuum impregnation with an epoxy resin-based glue.

Advantageously, composite materials of the type sold under the trade name of PAMITHERM as described above are used.

In FIG. 1, each plate is defined by its lateral sides, that is to say sides (14) and (23) respectively of the lamp and source modules and side (36) of the transfer module.

In addition, the impermeability at the plate level between the source and lamp modules and each of the transfer modules is ensured by two seals on either side of the plate, these two seals being compressed against the plate in the course of the assembly and mechanical clamping of modules.

Each seal has the shape of an impervious sheet which is attached to the lateral sides of the plate and includes the necessary openings to allow the light beam to pass through and means for fixing (such as tie rods) the modules to each other. Preferably, the seal is a silicon sheet.

The electrical energy source module (20) comprises a support stage for the source of electrical energy, this source could be of the ferromagnetic or electronic type. The electrical energy source module is preferably combined with an overheating safety system.

This impervious module is delimited by a casing comprising:

three sides (21) in contact with the external environment and which constitute the external sheath parts of the light generator.

a side (22) facing the side (13) of the source module without actually being in contact, two sides (23), each side facing one of the two transfer modules (30).

In accordance with the invention, side (22) is made of a good heat conductor and impervious material, preferably aluminum. The free space between the sides (13) and (22), respectively of the lamp and source modules, is advantageously in contact with the exterior which is, depending on the case, air or water. In this way, evacuation of some of the heat produced in the two modules can take place.

Similarly, sides (21) are made of a good heat conductor and impervious material, preferably in aluminum. In addition, sides (21) are also configured such that they have an external and internal surface area as large as possible. Advantageously, sides (21) have an internal side and an external side forming thermal exchange radiator, sufficient in number and size to allow evacuation of heat generated in the source module.

As indicated above, each side (23) corresponds to the side of a plate made of a porous mineral material whose porosity has been blocked and on which a seal has been mounted in the form of an impervious sheet made of silicon. In FIG. 1, the impervious and thermally insulating separation between the lamp and source modules on the one hand, and between each transfer module on the other hand, is made by means of a single plate as defined above and made impervious as described previously.

Each transfer module (30) which essentially comprises a focusing optic system (31) of the light beam, a mixer-bar (33) made of an optically transparent material and a connector (45) of optic fibers beam (50) or optic cable (50), is also delimited by an impervious casing comprising:

five sides (34, 34', 35) in contact with the external environment of the generator and which constitute parts of the external sheath of the light generator, one side (36) facing side (14) of the lamp module and side (23) of the source module.

In accordance with the invention, and as described above, each side (36) corresponds to a side of a plate made of a porous mineral material which porosity is blocked and on which a seal having the shape of an impervious silicon sheet is mounted.

As sides (21) of the source module and sides (15, 15' and 15") of the lamp module, sides (34, 34' and 35) of the transfer modules are made of a good heat conductor and impervious material, preferably in aluminum, and are configured such that their external surface and the internal surface are as large as possible. To this end, the external and internal surfaces consist of blades forming a thermal exchange radiator. An example of side (34') with blades is given in FIG. 3 corresponding to the section along axis CC of FIG. 2. This is one of the sides of the transfer module in contact with the external environment. A casing figure, similar to FIG. 3, is obtained for a section of the sides of the casing (15, 15', 15"), if the axis of section CC in the source and lamp modules is moved, or for sides (35) if a section along an axis perpendicular to axis CC is carried out.

In the generator described in FIGS. 1, 2 and 3, the source of electrical energy of the lamp is made by means of an impervious, high tension electric cable which successively passes through the sides (or walls) of the modules of source, of transfer and then of the one of lamp, up to the lamp cap. Each crossing of side (wall) of a module takes place through a seal.

In order not to complicate FIGS. 1, 2 and 3, the impervious electric cable is not represented.

As indicated above, for the passage of each light beams, a sealed window (16), made of an optically transparent material, is arranged in each side (14) of the lamp module, as well as a sealed window (32), made of an optically transparent material, in each side of the transfer modules (36).

A heat filter can be positioned at the level of one of these windows in order to filter infrared and ultraviolet at appropriate wavelengths.

It can be advantageous to place a heat filter between two focusing lenses (12, 31). Indeed, in this case, the lenses (12, 31) can be treated on all their sides or only on their sides receiving the light flux with a deposit of an antidazzle film to improve the transmission of the light flux.

This structure of separated modules, impervious and thermally insulated from each other, each module being equipped with means allowing the module internal heat to be evacuated, in particular by means of surfaces consisting of blades forming a thermal exchange radiator, allows to have an acceptable temperature at the connection level with the optic fibers.

In order to further reduce the temperature at the connection level with the optic fibers, particularly in the case of plastic optic fibers and of the use of a powerful lamp, a forced ventilation is provided by a ventilator (37) in each transfer module (30). Each ventilator (37) produces a forced air circulation in a chicane circuit around the blades, within each transfer module. This allows a considerable stirring of heat within the transfer modules which encourages the thermal transfer towards the outside of the generator.

Noise from this ventilator is significantly reduced by the use of a ventilation system consisting of an air suction and evacuation circuit comprised of pipes arranged in a zigzag configuration (chicane). As it can be seen on FIG. 2, the forced air circulation, indicated by "V", takes place around the blades of sides (34') and in a pipe (39) communicating with the forced air current around the blades. Pipe (39) is delimited by a metal plate (39'). The air aspiration and evacuation circuits driven by the ventilator (37) take place respectively in a suction chamber (SC) and in an evacuation chamber (EC), these two chambers being separated by the support plate (37') of the ventilator (37), fixed in each transfer module (30). This particular mechanical arrangement is intended to modify the normal trajectory of air circulation of the ventilation system to the hottest surfaces or the most sensitive surfaces, such as those of the ends of optic cables. The cooling can be improved, if necessary, by means of a Peltier-effect thermal exchange device (60) placed in each generator module, on the sides in contact with the external environment and/or on each mixer-bar (33).

According to the invention, an appreciable improvement is obtained for the pipes in chicane, both in terms of acoustic noise and heat dissipation.

With currently available conventional generators, the temperature at the optic cables inlet can reach 60° C., even when ventilators and heat filters are employed. In the scope of the invention, the temperature is reduced to 50° C. thanks to an arrangement in separated and thermally insulated modules and also thanks to the heat dissipation through the surfaces of the modules in contact with the external environment, especially when these sides have an internal surface and an external surface in the form of blades of radiator type, such a chicane structure for the cooling of the modules being particularly efficient. The temperature at the FOP cables inlet can be maintained below 50° C. with the Peltier-effect thermal exchange device.

The level of acoustic noise of the new generators, objects of the invention, is always below 44 dba (dba=unit of measurement of an acoustic pressure level measured under standard conditions) and can only be of 25 dba. This value is reduced to a minimum of 10 to 20 dba with respect to that measured for commercially available non-impervious generators.

FIG. 4 shows a diagrammatic view of horizontal section of a light generator comprising a single outlet to connect to the impervious optic fibers beam or an impervious optic cable. Such a generator is covered by claim 14.

The principal differences with the light generator shown in FIGS. 1, 2 and 3 are:

the presence of a reflector (18) in the impervious lamp module (10) which further comprises a lamp (11) and a focusing optic system (12); therefore, a single light beam is transmitted by the lamp (11), the presence of a single impervious transfer module (30) located next to the impervious lamp (10) and source (20) modules.

Consequently:

a single impervious and thermally insulating separation is provided between the lamp, the source and the transfer modules. This separation is limited here by the sides (14), (23) and (36). This separation consists of an impervious and thermally insulating material, preferably a porous mineral material whose porosity has been blocked by impregnation under vacuum with an epoxy resin based glue. Furthermore, the impermeability of this separation is reinforced by covering the sides (14, 23 and 36) with an impervious sheet such as a silicone sheet;

a single plate made of an impervious and good heat conductor material, preferably in aluminum, constitutes sides (19) and (29), respectively of the lamp (10) and source (20) modules, which are in contact with the external environment of the light generator.

Moreover, the plate comprising sides (19) and (29) preferably has external and internal surfaces that are as large as possible. Advantageously, these internal and external surfaces consist of blades forming a thermal exchange radiator to encourage dissipation of the heat generated inside the lamp and source modules towards the outside.

Otherwise, the light generator in FIGS. 4, 5 and 6 has the features of the light generator shown in FIGS. 1, 2 and 3 in terms of the internal and external structures of the lamp, source and transfer modules.

In accordance with the invention, the submersible light generator consists of impervious modules, the construction of the generator and its modules therefore has to be carried out under conditions which ensure an impermeability protection index of 68 inside each module, once the light generator has been constructed.

To do this, appropriately shaped seals are placed at the junction of plates forming the sides of the modules, at the level of the edges of the modules.

These seals must preferably be made of materials that are:

resistant to high temperatures, resistant to aggressive media such as acids, solvents, hydrocarbons, and capable of maintaining a good impermeability while being compressed.

These seals are preferably based on materials which are insulators resisting to high thermal stresses while retaining their elasticity.

The casing of each module can be manufactured from square or rectangular plates, chosen in a suitable material, mentioned above depending on the side in question, these plates being assembled by means of seals and fixed by means of tie rods going through the thickness of the plates.

The casing of each module can be made from a frame with an approximately parallelepipedic shape forming the four sides of the module casing, that is to say four sides made of a good conductor material, preferably in aluminum or an aluminum alloy. Such a frame with blades on some of its sides can be obtained by extrusion. Frames of a circular or polygonal section, possibly obtained by extrusion, can also be used to produce the casing for each module.

The closing of such a frame, in order to obtain an impervious module, is simply carried out, by placing, on the two facing openings of the frame, plates of suitable dimensions, made of appropriate materials according to the instructions given in the description below. Seals of appropriate shape must be placed at the junction of the frame and of the periphery of the plates.

All the seals provided between the plates of the modules or for the crossings of the module sides by the cables or windows for light beam should be sufficiently efficient to reach an impermeability protection index IP of 68.

This is why it is preferable to use seals made of materials obviously impervious, but also sufficiently elastic to be able to contain the expansion and shrinking of the generator structure at temperatures ranging from about −70° C. to about +300° C.

In FIG. 7 is shown a diagrammatically particular case of the light generator presented in FIGS. 4, 5 and 6, that is to say the case of a light generator including two lamps (11) with a reflector (18), each of these lamps (11) being encased alone in a lamp module (10a, 10b).

The diagrammatic view corresponds to a section along axis BB of a particular case of the light generator presented in FIGS. 4, 5 and 6.

According to this particular embodiment, a light beam is sent by each lamp (11) through the intermediary, notably, of focusing optics (12, 31) of the four impervious windows (16, 32) and, if necessary, of the heat filters (70), towards the impervious outlet (40) of this light generator on side (35) of the transfer module (30).

In this embodiment, heat filters (71) are placed in front (as in FIG. 7) or behind the mixer-bar (33) in order to absorb the infrared rays emitted and to protect the fiber beams (50), especially when these are made of plastic.

Advantageously, the two sides (80a) and (80b) of the lamp modules (10a)) and (10b)), which are opposite each other, are:

not in contact with each other, made of a good heat conductor material, preferably in aluminum or an aluminum alloy. Moreover, between the two sides (80a) and (80b), a free space is left where water or air can circulate, depending on whether the light generator is placed in a humid environment or not.

Each of FIGS. 8a and 8b represent diagrammatically modes of connection of an impervious optic fibers beam or of an impervious optic cable with the light generator according to the invention.

According to one embodiment, represented in FIG. 8a, the impervious optic cable (50) is firmly attached to the impervious connector (45). This set of interdependent elements can be connected or disconnected in an impervious manner, from the mixer-bar (33) which is kept in the generator and rests against one of the sides of the generator [side (35) on FIGS. 1 and 4].

According to the embodiment presented in FIG. 8b, the impervious optic cable (50) and the connector (45) are also interdependent.

The mixer-bar (33) is surrounded by a dissipator with circular section (42), having blades in aluminum. The heat dissipator (42) is attached to one side of the generator, at the level of a light beam outlet, by means of welding for example. The connection of the impervious optic cable (50) is carried out by inserting the connector (45) into a recess of suitable size in the dissipator (42) until the establishment of a contact with the mixer-bar.

FIG. 9 shows a preferred variant of the lamp module construction, wherein the lamp is placed in a casing which can be removed from the light generator.

According to this variant of the invention, the lamp, in the lamp module, is mounted in a casing which can slide to remove it from the lamp module without opening or any other necessary manipulation on the light generator. For this, the casing includes, in addition to the lamp, means for automatic connection and disconnection of the lamp and of the electric source by means of a connector comprising a male part and a female part, as well as a seal to ensure impervious contact between the casing and the rest of the lamp module, when the casing is inserted into the lamp module and in operating position.

Preferably, the casing is partly cylindrical, the joint is ring-shaped and the casing is screwed to the inside of the lamp module.

According to the embodiment shown in FIGS. 9a and 9b, the removable device (80) (or casing) for fixing and positioning the lamp (11) inside the generator includes:

a threaded cylinder (81) which is intended to be attached by screwing into the side of the lamp module in contact with the external environment of the generator, a lamp (11) with an electrical connection system (82) comprised of system of a male and female connectors, the fixed part of this electrical connection being linked to an electrical source (integrated or not into the generator), a support (83) for the lamp (11) placed inside an open cylinder (84) which allows the light beam to be spread in at least two directions. The cylinder (84) is surmounted by another cylinder (85), a part of which allows blockage and impermeability with the external sheath of the generator. These two cylinders (84) and (85) are connected by an axis which allows the rotation movement of cylinder (85) to be converted into a translation movement for cylinder (84) and to disconnect the lamp (11) from the electrical connection (82), the lamp support having its rotation blocked thanks to at least one snug (86) sliding along a groove (87) made along the cylindrical support (84) of the lamp (11). Moreover, the rotation of the cylindrical support (84) can be blocked due to the presence of a loose clamp (88) of cylinders (84) and (85). Pins (89) are provided to facilitate the removal of the device (80) in the direction indicated by the arrow.

A flat or ring shaped seal (not shown) around and above the threaded cylinder (81) makes it possible to ensure the impermeability IP 68, when the device (80) is fixed and correctly positioned in the light generator.

Different advantageous configurations or equivalent to those presented above for the light generator are possible within the scope of this invention. Thus for example:

blades of the internal and external surfaces of the generator module sides in contact with the external environment can be hollow and used to circulate a cold fluid to evacuate the heat generated;

it is possible to envisage using, at the level of the sealed windows made of an optically transparent material, facing each other between the lamp and the transfer modules, for example:

a focusing lens as a window, mounted in one of the opposite sides of the lamp and transfer modules by means of a seal, a heat filter, attached to one of the opposite sides of the modules of lamp and of transfer by means of a seal or inserted between the two windows, an optically transparent, impervious cylinder with an index gel to act as a thermal brake, improve optic transmission of light and prevent as much loss of light intensity as possible. Each end of the cylinder can act as a window and should then be, in an impervious manner, positioned in the openings provided in the opposite sides of the lamp and transfer modules, an impervious optics box, cylindrical or of other shape, each end of the box acting as windows and having to be set, in an impervious manner, in the provided openings in the to opposite sides of the lamp and transfer modules.

to avoid the risk of ageing of plastic optic fibers, an UV (ultraviolet) filter can be placed along the path of the light beam, inside the light generator;

the optics and mixer-bars can be treated for antireflection, with or without infrared and ultraviolet cut-out treatment;

the sides of mixer-bars and lenses can be treated on the sides receiving the light beam to reduce reflections. This leads to a 4% increase per treated side in accordance with the laws of physics. This process allows yield to be improved by 12 to 16% depending on the type of lens and lamp used;

a temperature sensor can be placed close to the cap of the lamp to allow the source of the lamp to be cut-off in case the temperature increases beyond the threshold of 50° C. at the tips of the optic cable;

lamps can be replaced by laser sources for long-distance beacon applications;

the optic fibers connector can be extended by a glass lens, notably with an index $n_1 > 1.5$, which improves the injection of the light flux;

the flux mixer-bar can be inserted into the optic connector.

preferably, the adjustable elements constituting the generator are assembled in such a way as to avoid thermal bridges.

What is claimed is:

1. Submersible light generator with an impermeability protection for glass or plastic optic fibers, wherein:

a) said submersible light generator comprises a plurality of impervious modules, said impervious modules being separated and thermally insulated from one another, said modules being further connected to one another so as to be impervious to gas and liquid, b) wherein the modules of the light generator comprise:
at least one impervious lamp module, comprising at least one lamp sending at least one light beam over at least one focusing optic system, the lamp module being connected to an electric energy source so as to be impervious to gas and liquids,
at least one impervious light transfer module which receives the light beam leaving the lamp module, wherein one of the lateral sides of the light transfer module is in proximity with the lateral sides of the lamp module, the passage of the light beam taking place across two sealed windows made of an optically transparent material, positioned opposite each other, respectively in said lateral sides of the lamp and light transfer modules, the light transfer module having on another of its sides a connector for a set of optic fibers;
c) between the lateral sides of the lamp and light transfer modules facing each other, outside the zone provided for the passage of the light beam which is delimited by the two sealed windows, means are provided to ensure the impermeability of the lamp and light transfer modules with the external environment, which take into account the thermal expansion and the thermal shrinkage of materials, and thermal insulation means positioned between these modules;
d) the other sides of the lamp and light transfer modules are made of a heat conductor material and, when said sides constitute part of the external sheath of the light generator, said other sides are configured to have a thermal exchange external surface in contact with the external environment and an internal surface in contact with the internal atmosphere of the modules allowing heat transfer towards the outer surface.

2. Submersible light generator according to claim 1 wherein the lamp and light transfer modules are separated by a thermal insulating unit in the form of a plate made of the material selected from the group consisting of porous, mineral and organic materials whose has been blocked and wherein the impermeability between the lamp and light transfer modules is carried out by means of two seals provided on both sides of the plates, these two seals being compressed against the plate in the course of assembly and mechanical clamping of the lamp and light transfer modules on each other.

3. Submersible light generator according to claim 2 wherein the porosity of said material has been blocked by soaking of said material in a glue under vacuum.

4. Submersible light generator according to claim 2 wherein the said plate thickness of the plate made of said material is equal to at least 5 mm.

5. Submersible light generator according to claim 4 wherein each seal comprises an impervious sheet, having openings formed therein to allow passage of the light beam and means for fixing the modules to each other.

6. Submersible light generator according to claim 1 wherein the sides of the lamp and light transfer modules which form the external sheath of the light generator have an internal surface and an external surface comprising blades forming a thermal exchange radiator.

7. Submersible light generator according to claim 1 wherein the light transfer module comprises a ventilator and/or a Peltier-effect thermal exchange device.

8. Submersible light generator according to claim 1 wherein the electrical energy source module is integrated into the generator, close to the other modules, and wherein thermal exchanges between the source module and the other generator modules is limited.

9. Submersible light generator according to claim 8 wherein the electrical energy source module is placed close to the lamp module and without making contact with the lamp module.

10. Submersible light generator according to claim 9 wherein the two sides of the light transfer and source modules facing each other are made of a heat conductor material which is preferably the same as the material used to manufacture the external sides of the light generator.

11. Submersible light generator according to claim 10 wherein a free space left between the two sides of the lamp and source modules facing each other is communicated with the exterior to allow circulation of a fluid.

12. Submersible light generator according to claim 1 wherein the lamp, in the lamp module, is mounted in a casing which is slidable for removal thereof from the lamp module without opening or any other manipulation on the light generator, the casing including, in addition to the lamp, means for automatic connection and disconnection of the lamp and of electric source by means of a connector comprising a male part and a female part, as well as a seal to ensure impervious contact between the casing and the rest of the lamp module, when the casing is inserted into the lamp module and in operating position.

13. Submersible light generator according to claim 1 wherein:
a) the generator comprises four impervious modules, said modules being thermally separated and insulated from each other, and connected to each other in an impervious manner,
b) the four modules comprise:
one lamp module, comprising a lamp without a reflector and two focusing optics sending out two focused light beams in two opposite directions,
one electrical energy source module positioned close to the lamp module comprising a support stage for the source of electrical energy and an impervious electrical connection to the lamp module,
two light transfer modules arranged on either side of lamp and source modules, each receiving a light beam leaving the lamp module and each including an outlet for the light beam, connected to a set of conducting optic fibers which conduct the light generated by the generator, the passage of each focused light beam taking place across two sealed windows made of an optically transparent material, positioned opposite each other in the lateral sides of the light transfer and lamp modules,
c) between the lateral sides of the lamp, the source and the light transfer modules facing each other, outside the zone where passage of the light beam takes place, which is delimited by the two sealed windows made of an optically transparent material, a filled joint, a thermal insulator and another seal are successively provided to ensure the impermeability of the lamp and light transfer modules with the external environment, as well as providing a thermal insulation between the two modules,
d) the other sides of the lamp, source and light transfer modules are made of a heat conductor material and, when these form part of the external sheath of the light generator, these other sides are configured such that they have a thermal exchange external surface in contact with the external environment and an internal surface in contact with the internal atmosphere of the modules allowing thermal transfer towards the outer surface.

14. Submersible light generator according to claim 1 wherein:
   a) the generator comprises three impervious modules, these modules being thermally separated and insulated from each other, and connected to each other in an impervious manner,
   b) the three modules are:
      one lamp module, comprising a lamp with a reflector and a focusing optic,
      one electrical energy source module positioned close to the lamp module comprising a support stage for the source of electrical energy and an impervious electrical connection to the lamp module,
      one light transfer module receiving the light beam leaving the lamp module and including an outlet connected to a set of conducting optic fibers which conduct the light generated by the generator, the passage of the light beam taking place across two sealed windows made of an optically transparent material, positioned opposite each other in the lateral sides of the light transfer and lamp modules,
   c) between the lateral sides of the lamp, source and light transfer modules facing each other, outside the zone provided for the passage of the light beam, which is delimited by the two sealed windows made of an optically transparent material, a seal, a thermal insulator and another seal are successively provided to ensure the impermeability of the lamp and light transfer modules with the external environment, as well as a thermal insulation between said two modules,
   d) said other sides of the lamp, source and light transfer modules are made of a heat conductor material and, when such form part of the external sheath of the light generator, said other sides are configured so that the external surface of the thermal exchange in contact with the external environment and an internal surface in contact with the internal atmosphere of the modules allow a thermal transfer towards the outer surface.

15. Submersible light generator according to claim 1 wherein the external area surface in contact with the external environment in each module has a surface area larger than that of the corresponding internal area surface.

* * * * *